United States Patent
Koji et al.

(10) Patent No.: US 8,969,499 B2
(45) Date of Patent: Mar. 3, 2015

(54) METHOD FOR PRODUCING POLYMER PARTICLES

(75) Inventors: Shinnosuke Koji, Yokohama (JP); Takayuki Hiratani, Tokyo (JP); Kazumichi Nakahama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 436 days.

(21) Appl. No.: 13/494,789

(22) Filed: Jun. 12, 2012

(65) Prior Publication Data
US 2012/0322965 A1 Dec. 20, 2012

(30) Foreign Application Priority Data

Jun. 15, 2011 (JP) .................................. 2011-133496
Nov. 16, 2011 (JP) .................................. 2011-250857

(51) Int. Cl.
| | | |
|---|---|---|
| C08F 2/18 | (2006.01) | |
| C08F 2/32 | (2006.01) | |
| C08F 2/38 | (2006.01) | |
| C08F 2/40 | (2006.01) | |
| C08F 212/08 | (2006.01) | |

(52) U.S. Cl.
CPC ... *C08F 2/32* (2013.01); *C08F 2/38* (2013.01); *C08F 2/40* (2013.01); *C08F 2/18* (2013.01); *C08F 212/08* (2013.01)
USPC ................ 526/237; 526/91; 526/95; 526/104

(58) Field of Classification Search
USPC ...................... 526/91, 95, 104, 237
See application file for complete search history.

(56) References Cited

U.S. PATENT DOCUMENTS

| 4,055,713 A * | 10/1977 | Moczygemba et al. ...... 526/207 |
| 7,005,490 B2 * | 2/2006 | Mestach et al. ............... 526/181 |
| 2005/0171312 A1 * | 8/2005 | Lacroix-Desmazes et al. ............................. 526/343 |
| 2012/0252974 A1 * | 10/2012 | Hiratani et al. .................. 525/25 |
| 2012/0277390 A1 * | 11/2012 | Hiratani et al. ............. 526/219.6 |
| 2014/0114036 A1 * | 4/2014 | Hiratani et al. ............. 526/219.5 |

FOREIGN PATENT DOCUMENTS

| WO | 2008/003728 A1 | 1/2008 | |
| WO | WO 2008003728 A1 * | 1/2008 | ................ C08F 2/18 |

OTHER PUBLICATIONS

Lacroix-Desmazes. Macromolecules 2005, 38(15), 6299-6309.*
Boyer. Macromolecules 2006, 39(12), 4044-4053.*
Boutevin. Macromol. Symp. 2007, 248(1), 150-157.*
Tonnar. Macromolecules 2007, 40(2), 186-190.*
Tonnar. Macromolecules 2007, 40(17), 6076-6081.*
Kim. Polymer 2012, 53, 4654-4059.*

(Continued)

*Primary Examiner* — Richard A Huhn
(74) *Attorney, Agent, or Firm* — Canon U.S.A., Inc. IP Division

(57) ABSTRACT

A method for producing polymer particles includes a preparation step for preparing a first oily liquid containing an oily olefin monomer, a radical polymerization initiator, and an iodine molecule; a synthesis step for obtaining a second oily liquid containing at least an iodine compound produced by a reaction between a radical generated by cleavage of the radical polymerization initiator and the iodine molecule in the first oily liquid; a suspension step for obtaining an oil droplet of the second oily liquid by suspending the second oily liquid in an aqueous solution containing an oxidizing agent, an acid, and a dispersant; and a polymerization step for polymerizing the oily olefin monomer in the oil droplet.

5 Claims, 5 Drawing Sheets

(56) References Cited

OTHER PUBLICATIONS

David. Chem. Rev. 2006, 106(9), 3936-3962.*
Lissi. J. Polym. Sci., Polymer Letters Edition 1976, 14(8), 499-502.*

Patrick Lacroix-Desmazes, Romain Severac, and Bernard Boutevin, Macromolecules, 2005, vol. 38, p. 6299-6309.
Jeff Tonner, Patrick Lacroix-Desmazes, and Bernard Boutevin, Macromolecules, 2007, vol. 40, p. 186-190.

* cited by examiner

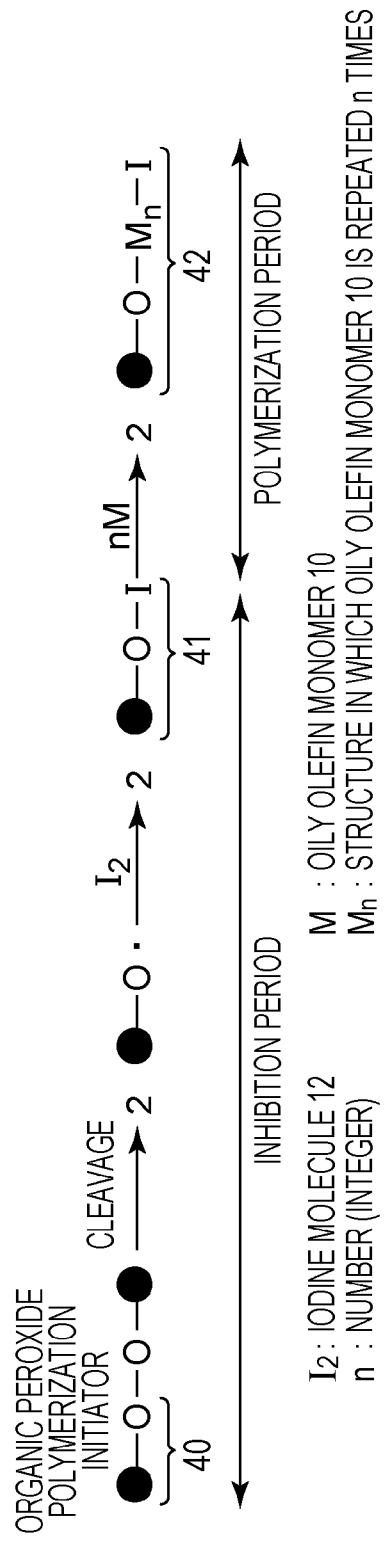
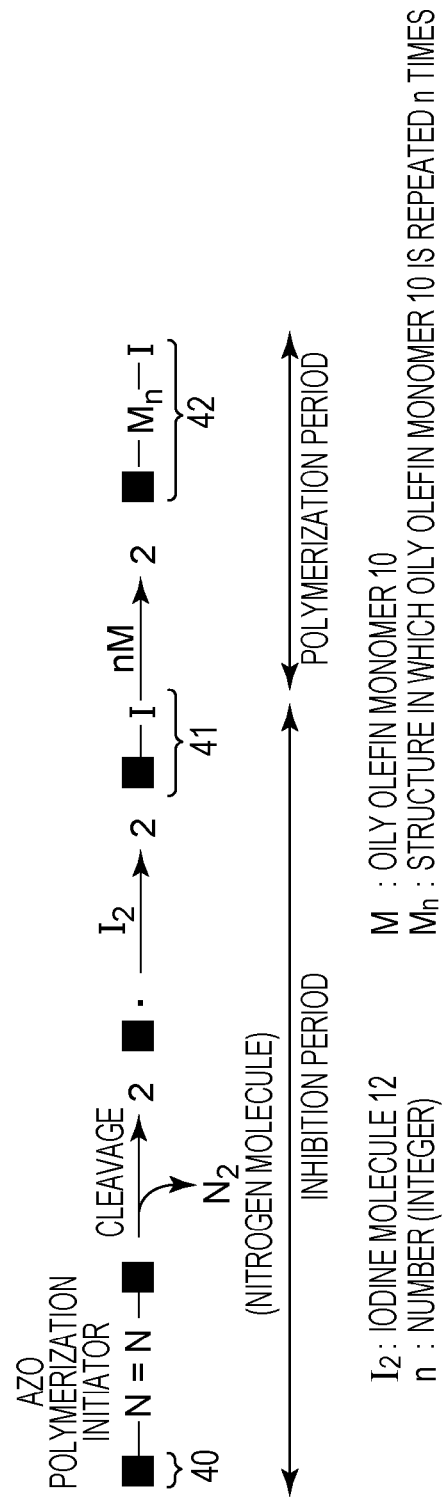

METHOD FOR PRODUCING POLYMER PARTICLES

BACKGROUND OF THE INVENTION

1. Field of the Invention

The present invention relates to a method for producing polymer particles.

2. Description of the Related Art

Polymer particles are produced by various polymerization methods such as suspension polymerization, emulsion polymerization, and precipitation polymerization. Among these polymerization methods, suspension polymerization is industrially widely used as, for example, a method for producing a polymerized toner because a functional substance such as a coloring material can be easily included in polymer particles.

Recently, the area of study regarding a technique for controlling the molecular weight of polymer particles has been activated. For example, a method is known in which living radical polymerization such as atom transfer radical polymerization or reversible addition-fragmentation chain transfer polymerization is combined with suspension polymerization. However, from the standpoint of problems of, for example, a remaining catalyst, safety and sanitation, and the cost, at present, it is difficult to industrially use many of such living radical polymerization methods.

As a method capable of easily controlling the molecular weight at a low cost, International Publication No. WO 2008/003728 (Patent Literature 1) and Patrick Lacroix-Desmazes, Romain Severac, and Bernard Boutevin, Macromolecules, 2005, Vol. 38, pp. 6299-6309 (Non-Patent Literature 1) disclose a method performed by using suspension polymerization and reverse iodine transfer polymerization in combination.

Jeff Tonner, Patrick Lacroix-Desmazes, and Bernard Boutevin, Macromolecules, 2007, Vol. 40, pp. 186-190 (Non-Patent Literature 2) discloses a method of producing polymer particles, the method being performed by using suspension polymerization and reverse iodine transfer polymerization in combination, in which molecular-weight controllability and the polymerization conversion rate are improved by adding hydrogen peroxide and hydrochloric acid in an aqueous phase.

SUMMARY OF THE INVENTION

According to experiments conducted by the inventors of the present invention, it was found that, in the case where suspension polymerization is combined with reverse iodine transfer polymerization in accordance with the method described in Patent Literature 1 or Non-Patent Literature 1, iodine molecules leak into an aqueous phase, thereby significantly decreasing molecular-weight controllability and the polymerization conversion rate.

Furthermore, the inventors of the present invention verified that, in the case where suspension polymerization is combined with reverse iodine transfer polymerization in accordance with the method described in Non-Patent Literature 2, it is necessary to control an aqueous solution to be strongly acidic (pH 2.5 or less) in order to achieve both satisfactory molecular-weight controllability and a satisfactory polymerization conversion rate. However, under such a strongly acidic condition, among dispersion stabilizers (hereinafter referred to as "dispersants") of a suspension in suspension polymerization, inorganic dispersants and some of anionic dispersants cannot be used, which is not industrially preferable in some cases.

The present invention provides a method for producing polymer particles, the method being performed by using suspension polymerization and reverse iodine transfer polymerization in combination, in which both satisfactory molecular-weight controllability and a satisfactory polymerization conversion rate can be achieved without requiring a strongly acidic condition.

A method for producing polymer particles according to an aspect of the present invention includes a preparation step for preparing a first oily liquid containing an oily olefin monomer, a radical polymerization initiator, and an iodine molecule; a synthesis step for obtaining a second oily liquid containing at least an iodine compound produced by a reaction between a radical generated by cleavage of the radical polymerization initiator and the iodine molecule in the first oily liquid; a suspension step for obtaining an oil droplet of the second oily liquid by suspending the second oily liquid in an aqueous solution containing an oxidizing agent, an acid, and a dispersant; and a polymerization step for polymerizing the oily olefin monomer in the oil droplet.

According to the aspect of the present invention, it is possible to provide a method for producing polymer particles, the method being performed by using suspension polymerization and reverse iodine transfer polymerization in combination, in which both satisfactory molecular-weight controllability and a satisfactory polymerization conversion rate can be achieved without requiring a strongly acidic condition.

Further features of the present invention will become apparent from the following description of exemplary embodiments with reference to the attached drawings.

BRIEF DESCRIPTION OF THE DRAWINGS

FIGS. 4A and 4B are drawings each illustrating a production mechanism of an iodine compound in reverse iodine transfer polymerization.

DESCRIPTION OF THE EMBODIMENTS

A method for producing polymer particles according to the present invention includes a preparation step for preparing a first oily liquid containing an oily olefin monomer, a radical polymerization initiator, and an iodine molecule; a synthesis step for obtaining a second oily liquid containing at least an iodine compound produced by a reaction between a radical generated by cleavage of the radical polymerization initiator and the iodine molecule in the first oily liquid; a suspension step for obtaining an oil droplet of the second oily liquid by suspending the second oily liquid in an aqueous solution containing an oxidizing agent, an acid, and a dispersant; and a polymerization step for polymerizing the oily olefin monomer in the oil droplet.

Figure 5:
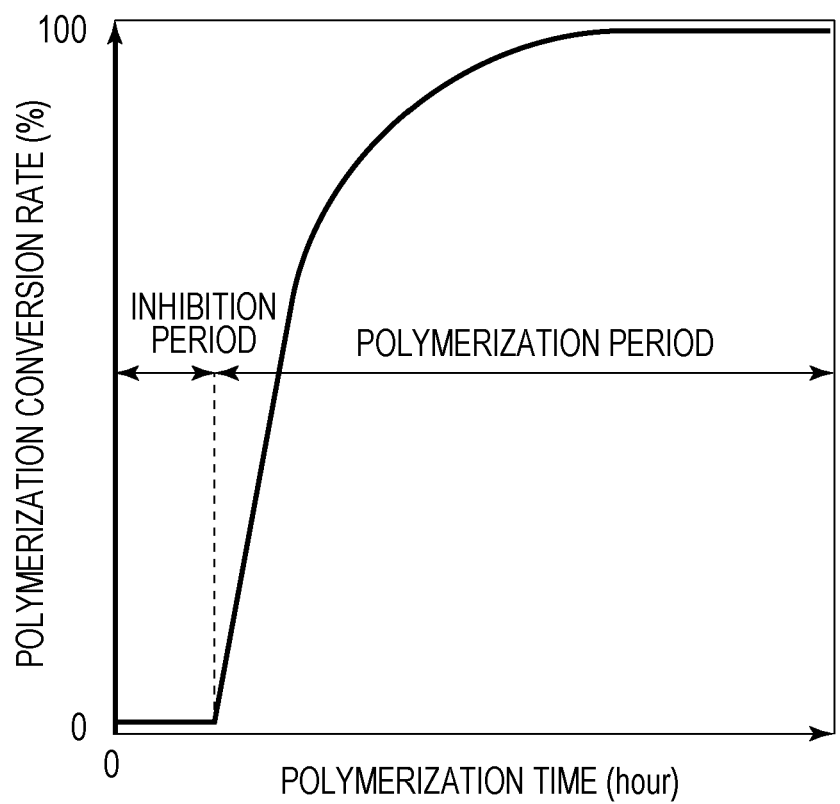
FIG. 5 is a graph that schematically shows a typical relationship between the polymerization conversion rate and the polymerization time in reverse iodine transfer polymerization.

The method for producing polymer particles according to the present invention is performed by using reverse iodine transfer polymerization. First, reverse iodine transfer polymerization will be described. Reverse iodine transfer polymerization is living radical polymerization characterized by using iodine molecules, as described in, for example, Non-Patent Literature 1. FIG. 5 schematically shows a typical relationship between the polymerization conversion rate and the polymerization time in reverse iodine transfer polymerization. A polymerization reaction in reverse iodine transfer polymerization is divided into an inhibition period induced in the initial stage of the polymerization reaction and a polymerization period induced in the middle and late stages of the polymerization reaction. In the inhibition period, an iodine compound is produced by a reaction between a radical generated by cleavage of a radical polymerization initiator and an iodine molecule. In the polymerization period, polymer compounds are produced by a chain reaction of a monomer with intervention of the iodine compound and the radical polymerization initiator. As shown in FIG. 5, reverse iodine transfer polymerization is characterized in that the polymerization conversion rate hardly changes during the inhibition period, and increases during the polymerization period with the increase in the polymerization time.

FIGS. 4A and 4B are drawings each illustrating a production mechanism of an iodine compound in reverse iodine transfer polymerization. As illustrated in FIGS. 4A and 4B, an iodine compound 41 is produced by a reaction between a radical having a chemical structure of a residue 40 generated by cleavage of a radical polymerization initiator and an iodine molecule ($I_2$). That is, the iodine compound 41 has a chemical structure in which an iodine atom is directly bonded to the residue 40. Alternatively, the iodine compound may have a chemical structure in which an iodine atom is directly bonded to a derivative of the residue 40, the derivative being generated by further cleavage of a radical having the chemical structure of the residue 40. Furthermore, an oligomer 42 in which an oily olefin monomer (M) 10 is interposed between the residue 40 and an iodine atom may be mixed as an iodine compound. FIG. 4A illustrates a case where an organic peroxide polymerization initiator is used as the radical polymerization initiator, and FIG. 4B illustrates a case where an azo polymerization initiator is used as the radical polymerization initiator.

The molecular weight of a polymer compound obtained by ideal reverse iodine transfer polymerization (in the case where the polymerization conversion rate is 100%) depends on the amount of iodine molecules charged as represented by formula (1):

(Molecular weight of polymer compound)=[(Weight of monomer charged)/{2×(The number of iodine molecules charged)}]+(Mass number of residue of radical polymerization initiator)+(Mass number of iodine atom)   Formula (1)

The polymer particles in the present invention are a form of particles obtained when the polymer compound is formed into particles by a limitation of interfacial energy in the suspension step and the polymerization step of suspension polymerization. That is, the term "molecular weight of a polymer compound" and the term "molecular weight of polymer particles" used herein represent the same concept.

Next, a problem of an existing method for producing polymer particles, the method being performed by using reverse iodine transfer polymerization and suspension polymerization in combination, will now be described with reference to FIG. 2.

Figure 2:
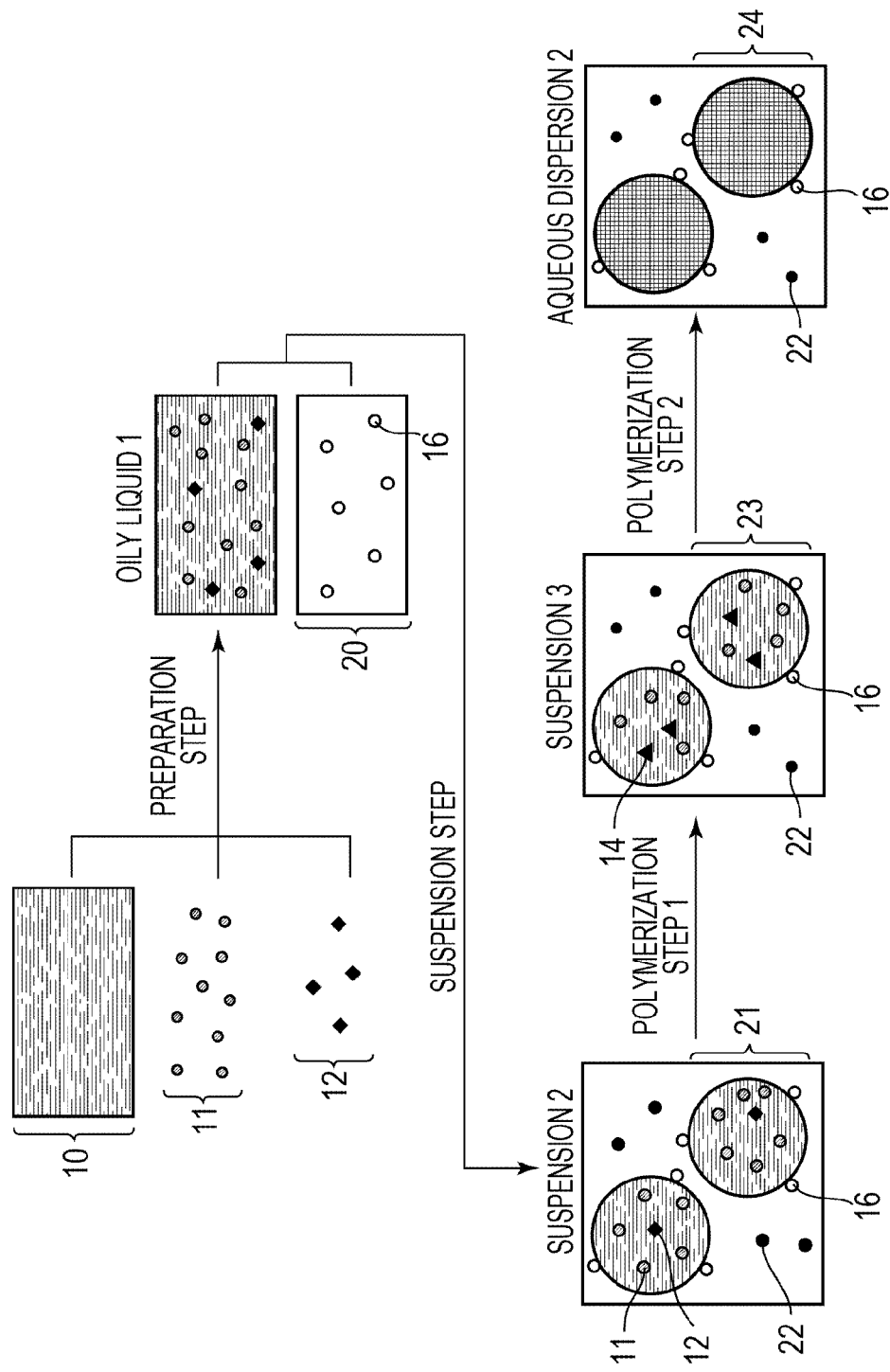
FIG. 2 is a process drawing illustrating a method for producing polymer particles in the related art.

FIG. 2 is a process drawing illustrating an existing method for producing polymer particles described in Non-Patent Literature 1. In FIG. 2, an oily olefin monomer 10, a radical polymerization initiator 11, and iodine molecules 12 are mixed in a preparation step to obtain an oily liquid 1. Next, in a suspension step for suspending the oily liquid 1 in water 20 containing a dispersant 16, a suspension 2 in which oil droplets 21 of the oily liquid 1 are dispersed in the water 20 is obtained.

Next, in a polymerization step 1, the inhibition period of reverse iodine transfer polymerization occurs in the oil droplets 21, and radicals generated by cleavage of the radical polymerization initiator 11 and the iodine molecules 12 react with each other, thus obtaining a suspension 3 in which oil droplets 23 containing an iodine compound 14 are dispersed in the water 20. Lastly, in a polymerization step 2, the polymerization period of reverse iodine transfer polymerization occurs in the oil droplets 23, and an aqueous dispersion 2 in which polymer particles 24 are dispersed in the water 20 is obtained. For the sake of convenience of description, the polymerization step 1 (inhibition period) and the polymerization step 2 (polymerization period) have been separately described. However, these steps are a continuous polymerization step in the actual experimental operation.

The inventors of the present invention believe that, in the existing method for producing polymer particles, the method being performed by using reverse iodine transfer polymerization and suspension polymerization in combination, the essence of the problem occurs in the suspension step in FIG. 2. Specifically, the essence of the problem lies in that, when the oily liquid 1 is suspended in the water 20 in the suspension step to obtain the suspension 2 in which the oil droplets 21 composed of the oily liquid 1 are dispersed in the water 20, some of the iodine molecules 12 are hydrolyzed and leak from the oil droplets 21 into the water 20 in the form of iodide ions ($I^-$) 22.

Referring to formula (1), the molecular weight of a polymer compound in reverse iodine transfer polymerization depends on the amount of iodine molecules charged. Therefore, the leakage of the iodine molecules 12 in FIG. 2 inevitably degrades the molecular-weight controllability. Furthermore, in the case where an organic peroxide polymerization initiator having a high oxidizing power is used as the radical polymerization initiator 11, the radical polymerization initiator 11 is decomposed by the iodide ions ($I^-$) 22, and thus the polymerization conversion rate is also decreased.

Figure 3:
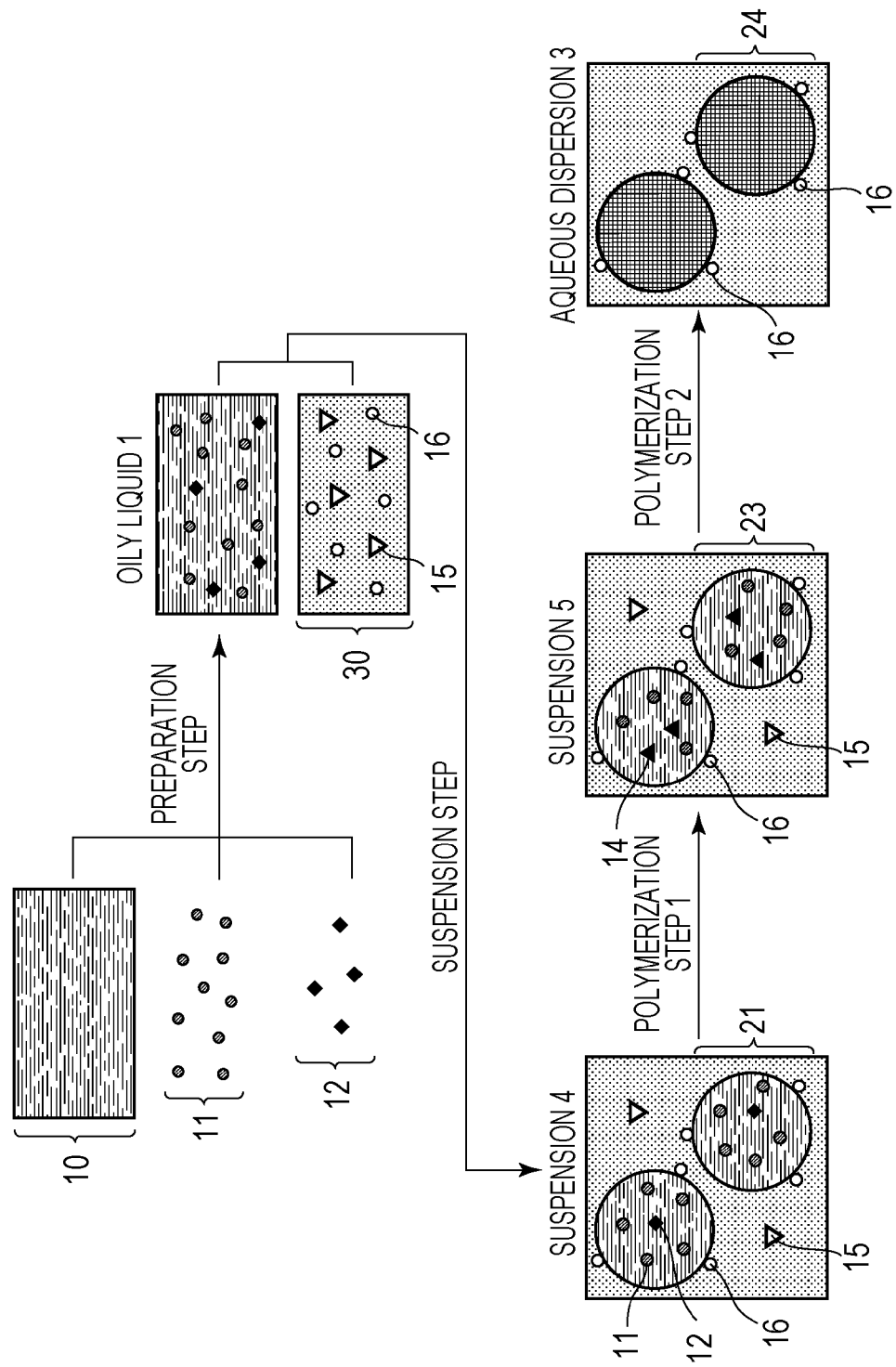
FIG. 3 is a process drawing illustrating a method for producing polymer particles in the related art.

FIG. 3 is a process drawing illustrating an existing method for producing polymer particles described in Non-Patent Literature 2. In FIG. 3, an oily olefin monomer 10, a radical polymerization initiator 11, and iodine molecules 12 are mixed in a preparation step to obtain an oily liquid 1. Next, in a suspension step for suspending the oily liquid 1 in a strongly acidic aqueous solution 30 containing an oxidizing agent 15 and a dispersant 16, a suspension 4 in which oil droplets 21 of the oily liquid 1 are dispersed in the strongly acidic aqueous solution 30 is obtained. Next, as in the method illustrated in FIG. 2, an aqueous dispersion 3 in which polymer particles 24 are dispersed in the strongly acidic aqueous solution 30 is obtained through a polymerization step 1 and a polymerization step 2.

The oxidizing agent 15 contained in the aqueous solution oxidizes iodide ions ($I^-$) 22 generated by hydrolysis of the iodine molecules 12 to produce iodine molecules 12. This oxidation reaction is accelerated by the strongly acidic aqueous solution. As a result, the leakage of the iodine molecules 12 is suppressed, and both a satisfactory polymerization conversion rate and satisfactory molecular-weight controllability can be achieved. The inventors of the present invention confirmed that the aqueous solution is preferably strongly acidic in order to suppress the leakage of the iodine molecules 12. For example, when a weakly acidic aqueous solution is used, the leakage of the iodine molecules 12 cannot be sufficiently suppressed, and thus satisfactory molecular-weight controllability cannot be obtained. However, under a strongly acidic condition, among dispersants of a suspension in suspension polymerization, inorganic dispersants and some of anionic dispersants cannot be used, which is not industrially preferable in some cases. For example, if an inorganic dispersant or a certain anionic dispersant is used under a strongly acidic condition, the oil droplets 21 may aggregate and thus polymer particles may not be obtained.

Next, a method for producing polymer particles according to the present invention will be described with reference to FIG. 1.

Figure 1:
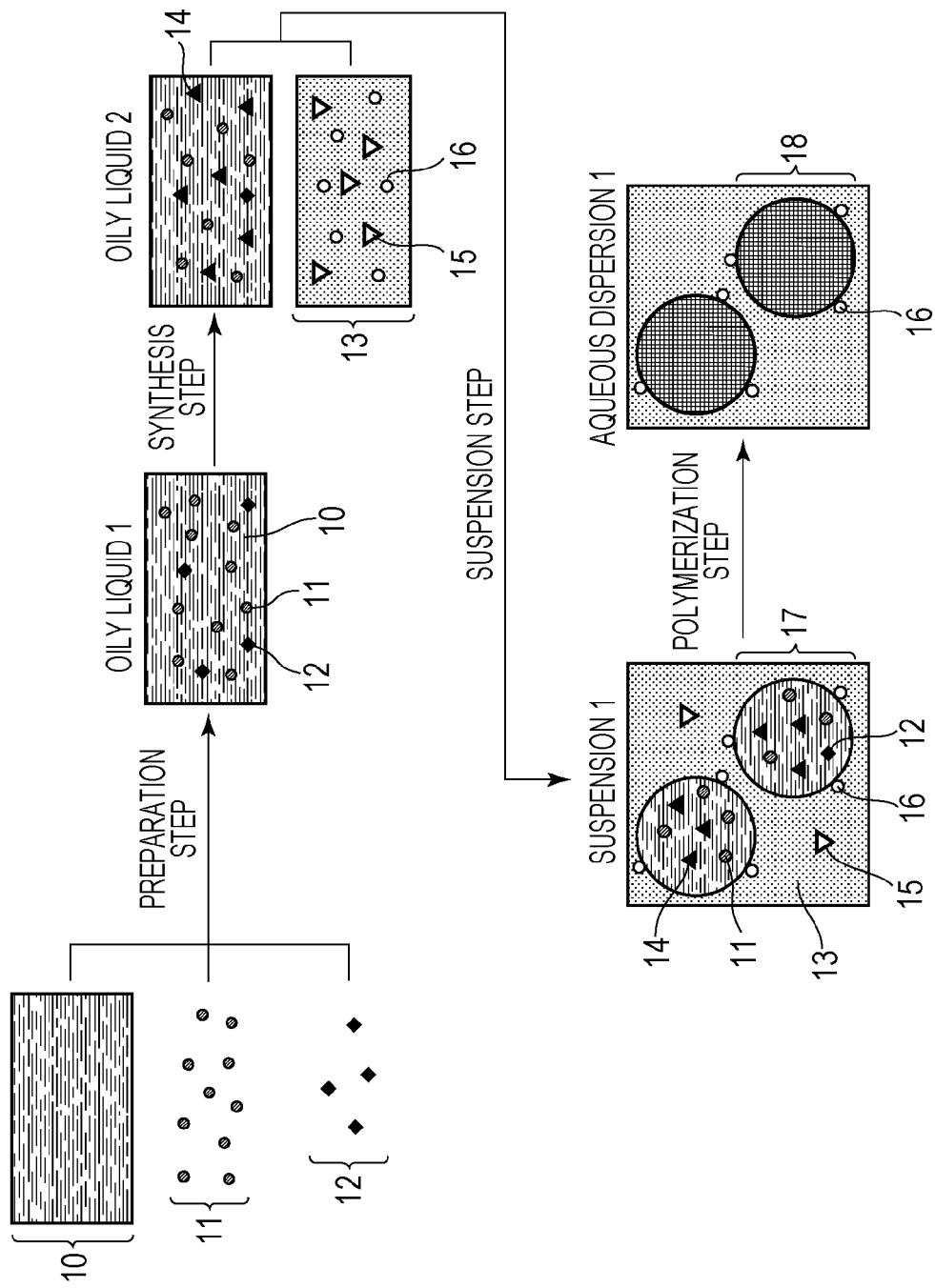
FIG. 1 is a process drawing illustrating a method for producing polymer particles according to an embodiment of the present invention.

In FIG. 1, an oily olefin monomer 10, a radical polymerization initiator 11, and iodine molecules 12 are mixed in a preparation step to obtain an oily liquid 1. Next, in a synthesis step, the inhibition period of reverse iodine transfer polymerization occurs in the oily liquid 1, and the radical polymerization initiator 11 and the iodine molecules 12 react with each other, thus obtaining an oily liquid 2 containing an iodine compound 14. Next, in a suspension step, the oily liquid 2 is suspended in an aqueous solution 13 containing an oxidizing agent 15, a dispersant 16, and an acid to obtain a suspension 1 in which oil droplets 17 of the oily liquid 2 are dispersed in the aqueous solution 13. Lastly, in a polymerization step, the polymerization period of reverse iodine transfer polymerization occurs in the oil droplets 17, and an aqueous dispersion 1 in which polymer particles 18 are dispersed in the aqueous solution 13 is obtained.

As illustrated in FIG. 1, a first feature of the present invention lies in that, before the suspension step, the iodine compound 14 is obtained in the synthesis step by allowing some or all of the iodine molecules 12 to react with radicals generated by cleavage of the radical polymerization initiator 11. As described above, the iodine compound 14 has a chemical structure in which the residue 40 of the radical polymerization initiator 11 generated by a reaction corresponding to the inhibition period in FIGS. 4A and 4B is directly bonded to an iodine atom. Even when the iodine compound 14 comes in contact with water, the iodine compound 14 is not hydrolyzed. Furthermore, the iodine compound 14 has lipophilicity significantly higher than that of iodine molecules 12. Therefore, the iodine compound 14 remains in the oil droplets 17 without leaking into the aqueous solution 13 in the suspension step. Accordingly, the method for producing polymer particles in the present invention essentially solves the problem in the method illustrated in FIG. 2. Note that an increase in the proportion of oligomers in the iodine compound 14 may not be preferable because the viscosity of the oily liquid 2 increases and it becomes difficult to carry out the suspension step.

Furthermore, as illustrated in FIG. 1, a second feature of the present invention lies in that the oily liquid 2 is suspended in the aqueous solution 13 containing the oxidizing agent 15, the dispersant 16, and the acid. In the case where unreacted iodine molecules 12 are present in the oil droplets 17 after the synthesis step, the unreacted iodine molecules 12 may be hydrolyzed and may leak into the aqueous solution 13 in the form of iodide ions ($I^-$). To prevent this leakage, the aqueous solution 13 containing the oxidizing agent 15 and the acid is used for the purpose of suppressing the hydrolysis of the unreacted iodine molecules 12 and oxidizing the iodide ions ($I^-$) generated by the hydrolysis to reproduce iodine molecules 12. In the method illustrated in FIG. 1, some or all of the iodine molecules 12 react with the radical polymerization initiator 11 to produce the iodine compound 14, and thus the amount of iodide ions ($I^-$) that leak into the aqueous solution 13 is very small, as compared with the method illustrated in FIG. 3. Therefore, it is not necessary to control the aqueous solution 13 to be strongly acidic.

In addition, the oily liquid 1 or the oily liquid 2 may contain functional substances besides the oily olefin monomer 10, the radical polymerization initiator 11, and the iodine molecules 12.

Examples of the functional substance include imide compounds such as N-iodosuccinimide, succinimide, maleimide, and phthalic imide; aromatic amine compounds such as diphenylamine; and phosphorous acid compounds such as diethyl phosphite. The group of these compounds functions as a polymerization catalyst in reverse iodine transfer polymerization and thus contributes to an improvement in the rate of a polymerization reaction.

A hydrophobe (co-surfactant) having a solubility in water of 0.01 g/L or less may be incorporated as a functional substance in the oily liquid 1 or the oily liquid 2. The use of the hydrophobe stabilizes a suspension. This is advantageous in that very small oil droplets can be formed in the suspension step described below. Specific examples of the hydrophobe include a group of compounds such as (a) C8 to C30 linear chain, branched chain, or cyclic alkanes, e.g., hexadecane, squalane, and cyclooctane; (b) C8 to C30 alkyl(meth)acrylates, e.g., stearyl methacrylate and dodecyl methacrylate; (c) C8 to C30 alkyl alcohols, e.g., cetyl alcohol; (d) C8 to C30 alkylthiols, e.g., dodecyl mercaptan; (e) polymers, e.g., polyurethane, polyester, and polystyrene; and (f) long-chain aliphatic or aromatic carboxylic acids, long-chain aliphatic or aromatic carboxylic acid esters, long-chain aliphatic or aromatic amines, ketones, halogenated alkanes, silanes, siloxanes, and isocyanates.

In the case where an oil-soluble dye having reactivity with iodine molecules, such as copper tetra-tert-butyl phthalocyanine, is used as a functional substance, the functional substance is preferably incorporated in the oily liquid 2 after the synthesis step described below. In the case where such a functional substance is incorporated in the oily liquid 1 before the synthesis step, it may become difficult to achieve both a satisfactory polymerization conversion rate and satisfactory molecular-weight controllability because of the effect of side reactions.

The functional substance is not limited to the above substances, and two or more functional substances may be used in combination.

(Preparation Step)

The preparation step in the present invention is a step for preparing an oily liquid 1 by mixing an oily olefin monomer, a radical polymerization initiator, and iodine molecules, and making these components compatible with each other. Oily organic solvents may be used in combination as an auxiliary agent that promotes the compatibilization. Furthermore, a chemical substance other than the oily olefin monomer, the radical polymerization initiator, iodine molecules, and the oily organic solvent may also be added. In particular, in the case where the oily olefin monomer is solid at room temperature, an oily organic solvent is preferably used in combination. Examples of the oily organic solvent used in the preparation step include, but are not limited to, common oily organic solvents such as toluene, benzene, chloroform, and ethyl acetate. Two or more oily organic solvents may be used in combination.

(Synthesis Step)

The synthesis step in the present invention is a step for synthesizing an iodine compound by allowing some or all of the iodine molecules to react with radicals generated by cleavage of the radical polymerization initiator, and corresponds to the inhibition period of reverse iodine transfer polymerization. An oily liquid 2 contains at least the oily olefin monomer, the radical polymerization initiator, and the iodine compound.

As a method for inducing radical generation caused by cleavage of the radical polymerization initiator, a known method such as heating, light irradiation, or addition of a reducing agent may be used. Among these methods, heating is preferable from the standpoint of good workability and controllability of the reaction. In the case where the reaction is induced by heating, the heating is preferably performed in the range of a 10-hour half-life temperature of the radical polymerization initiator or higher and 40° C. higher than the 10-hour half-life temperature or lower. More preferably, the heating is performed in the range of a 10-hour half-life temperature of the radical polymerization initiator or higher and 30° C. higher than the 10-hour half-life temperature or lower. When the heating is performed at a temperature higher than a temperature that is 40° C. higher than the 10-hour half-life temperature, controllability of the reaction may become significantly degraded. When the heating is performed at a temperature lower than the 10-hour half-life temperature, the time necessary for the synthesis step becomes very long. Thus, heating at a temperature lower than the 10-hour half-life temperature is not preferable from the standpoint of controllability of the reaction and production efficiency. A plurality of methods may be used in combination as a method for inducing the reaction. The method for inducing the reaction of the present invention is preferably performed in an atmosphere of an inert gas such as argon gas or nitrogen gas.

In the present invention, a molar ratio of the radical polymerization initiator to iodine molecules, i.e., [radical polymerization initiator (mol)]/[iodine molecule (mol)] is preferably more than 1 and 20 or less. In the case where the molar ratio is 1 or less, the polymerization reaction terminates, and thus it is difficult to achieve a satisfactory polymerization conversion rate. On the other hand, in the case where the molar ratio exceeds 20, a chain reaction of the monomer without intervention of an iodine compound occurs as a side reaction, and thus it is difficult to achieve satisfactory molecular-weight controllability. A molar ratio of the oily olefin monomer to iodine molecules, i.e., [oily olefin monomer (mol)]/[iodine molecule (mol)] can be appropriately changed.

In the present invention, a ratio of the amount of iodine molecule that has reacted in the synthesis step and is contained in the oily liquid 2 to the amount of iodine molecule contained in the oily liquid 1 ((1−[the amount (mol) of iodine molecule contained in the oily liquid 2]/[the amount (mol) of iodine molecule contained in the oily liquid 1])×100; iodine-molecule reaction rate [%]) is preferably 30% or more, and more preferably 50% or more. If the iodine-molecule reaction rate is less than 30%, it is difficult to effectively suppress the leakage of iodine molecules into an aqueous phase in the suspension step and subsequent steps. Even in the suspension step of the present invention, in which an aqueous solution containing an oxidizing agent and an acid is used, the leakage of iodine molecules into an aqueous phase cannot be effectively suppressed, resulting in degradation of molecular-weight controllability. When the iodine-molecule reaction rate is 30% or more and 100% or less, the advantage of the present invention can be achieved. The time necessary for the synthesis step may become long depending on the method for inducing radical generation, reaction conditions, the type of radical polymerization initiator, etc. In such a case, setting the iodine-molecule reaction rate to about 30% is preferable because the time necessary for the synthesis step is reduced to improve production efficiency.

(Suspension Step)

The suspension step in the present invention is a step for suspending the oily liquid 2 in an aqueous solution containing an oxidizing agent, a dispersant, and an acid to obtain a suspension in which oil droplets of the oily liquid 2 are dispersed in water.

By using the aqueous solution containing an oxidizing agent and an acid as a suspending medium, leakage of unreacted iodine molecules contained in the oily liquid 2 into the aqueous phase can be suppressed, while iodide ions ($I^-$) generated by the leakage can be oxidized and reproduced to iodine molecules. As a result, unreacted iodine molecules contained in the oily liquid 2 can be retained in the oil droplets, thus improving molecular-weight controllability.

The pH of the aqueous solution of the present invention is preferably 4 or more and 7 or less, and more preferably 5 or more and 6 or less. If the pH of the aqueous solution is less than 4, an inorganic dispersant dissolves, and thus dispersion stability of the resulting suspension cannot be maintained. Furthermore, regarding an anionic dispersant derived from a carboxylic group, dissociation of the carboxyl group is suppressed at a pH of less than 4, and thus dispersion stability of the resulting suspension cannot be maintained. On the other hand, if the pH of the aqueous solution exceeds 7, the hydrolysis reaction of unreacted iodine molecules in the oil droplets is accelerated. Consequently, iodine molecules leak into the aqueous solution, thereby degrading the molecular-weight controllability. Examples of the acid for adjusting the pH of the aqueous solution include, but are not limited to, common acids such as hydrochloric acid, nitric acid, and sulfuric acid. Two or more acids may be used in combination.

The amount of oxidizing agent contained in the aqueous solution of the present invention is preferably equimolar to the amount of unreacted iodine molecules contained in the oily liquid 2 or more. In order to accelerate oxidation of iodide ions ($I^-$), the oxidizing agent may be added in an amount larger than the amount of unreacted iodine molecules. However, in the case where the oxidizing agent or a derivative or decomposition product of the oxidizing agent has a polymerization-inhibiting property, attention should be paid to the amount of oxidizing agent added. For example, in the case where hydrogen peroxide is used as the oxidizing agent, oxygen, which is a decomposition product of hydrogen peroxide, may inhibit polymerization, and thus it is necessary to appropriately select an amount that does not inhibit polymerization.

For the suspension, a known stirring and shearing device with which a suspension is prepared by providing mechanical energy can be used. Examples of the device include a high-shear homomixer, an ultrasonic homogenizer, a high-pressure homogenizer, and a thin-film rotating high-speed mixer. For the suspension, it is also possible to use a known suspension method for obtaining a suspension on the basis of a surface-chemical mechanism, such as a membrane emulsification method using a shirasu porous glass (SPG) membrane, or a microreactor used in a microchannel emulsification method, a branched microchannel emulsification method, or the like. These methods may be used alone or in combination of two or more methods.

In the suspension step of the present invention, the oily liquid 2 preferably has a viscosity of 50 mPa·s or less. A viscosity of the oily liquid 2 of more than 50 mPa·s is not preferable because it is difficult to prepare a suspension having good dispersibility by providing mechanical energy.

In the suspension step of the present invention, a dispersant is incorporated in the aqueous solution in order to improve dispersion stability of the suspension. The dispersant may be incorporated at any timing of before the suspension step, during the suspension step, and after the suspension step. However, the dispersant is preferably incorporated before or during the suspension step. In the present invention, since a strongly acidic condition is not applied to the aqueous solution, various types of dispersants can be used, as compared with the related art. Examples of the dispersant that can be used include known dispersants such as anionic low-molecular-weight surfactants, cationic low-molecular-weight surfactants, nonionic low-molecular weight surfactants, anionic polymer dispersants, cationic polymer dispersants, nonionic polymer dispersants, and inorganic dispersants.

Among these dispersants, inorganic dispersants are preferably used because they have a high effect of improving dispersion stability based on a blocking action and exhibit good stability against a temperature change. Furthermore, the use of inorganic dispersants is preferable from the standpoint that polymer particles, which are target substances, can be easily isolated and purified. Examples of the inorganic dispersant include, but are not limited to, polyvalent metal salts of phosphoric acid such as calcium phosphate, magnesium phosphate, aluminum phosphate, and zinc phosphate; carbonates such as calcium carbonate and magnesium carbonate; inorganic salts such as calcium metasilicate, calcium sulfate, and barium sulfate; calcium hydroxide; magnesium hydroxide; aluminum hydroxide; silica; bentonite; and alumina.

These dispersants may be used alone or in combination of two or more dispersants. In addition, a chemical substance other than the dispersant may be added before the suspension step, during the suspension step, or after the suspension step.

(Polymerization Step)

The polymerization step in the present invention is a step for inducing the polymerization period of reverse iodine transfer polymerization in oil droplets composed of the oily liquid 2 and dispersed in the aqueous solution containing the oxidizing agent, the acid, and the dispersant to obtain an aqueous dispersion of polymer particles.

A method for inducing the polymerization period of reverse iodine transfer polymerization is the same as a common method for inducing radical polymerization. Specifically, a known method such as heating, light irradiation, or addition of a reducing agent can be used. Among these methods, heating is preferable from the standpoint of good workability and controllability of a reaction. In the case where the polymerization period is induced by heating, the heating is preferably performed in the range of a 10-hour half-life temperature of the radical polymerization initiator or higher and 40° C. higher than the 10-hour half-life temperature or lower. More preferably, the heating is performed in the range of the 10-hour half-life temperature of the radical polymerization initiator or higher and 30° C. higher than the 10-hour half-life temperature or lower. When the heating is performed at a temperature higher than a temperature that is 40° C. higher than the 10-hour half-life temperature, controllability of the polymerization reaction may become significantly degraded. Heating at a temperature of higher than 100° C. is not preferable because the water of the suspension may boil. When the heating is performed at a temperature lower than the 10-hour half-life temperature, the time necessary for the polymerization step becomes very long. Thus, heating at a temperature lower than the 10-hour half-life temperature is not preferable from the standpoint of controllability of the polymerization reaction and production efficiency.

In the polymerization step of the present invention, the heating temperature may be increased or decreased. A plurality of methods may be used in combination as a method for inducing the polymerization period of reverse iodine transfer polymerization. The method for inducing the polymerization period of reverse iodine transfer polymerization of the present invention is preferably performed in an atmosphere of an inert gas such as argon gas or nitrogen gas.

(Method for Recovering Polymer Particles)

Polymer particles of the present invention can be recovered from the aqueous dispersion of polymer particles obtained in the polymerization step by solid-liquid separation using a method such as decantation, filtration, or centrifugal separation. The method for recovering the polymer particles is not limited thereto, and other known methods may also be used. These methods may be used alone or in combination of two or more methods.

[Radical Polymerization Initiator]

In the present invention, known radical polymerization initiators can be used. Among known radical polymerization initiators, it is preferable to use oil-soluble radical polymerization initiators that have a solubility in water at 20° C. of 10% by weight or less and that are soluble in the oily olefin monomer at reaction temperatures in the synthesis step and the polymerization step. Specific examples of the radical polymerization initiator include azo polymerization initiators such as 2,2'-azobisisobutyronitrile, 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl-4-methoxyvaleronitrile), and 2,2'-azobis-(2,4-dimethylvaleronitrile); and organic peroxide polymerization initiators such as dibenzoyl peroxide, cumene hydroperoxide, di-2-ethylhexyl peroxydicarbonate, di-sec-butyl peroxydicarbonate, acetyl peroxide, and peracid esters (e.g., t-butyl peroctoate and α-cumyl peroxypivalate). Photoradical polymerization initiators such as acetophenones and ketals may also be used. Among these radical polymerization initiators, azo polymerization initiators and peroxide polymerization initiators having a peroxydicarbonate skeleton are more preferably used. This is because, in experiments conducted by the inventors of the present invention, it was confirmed that the molecular-weight controllability and the polymerization conversion rate could be particularly satisfactorily controlled when an azo polymerization initiator or a peroxide polymerization initiator having a peroxydicarbonate skeleton was used.

The peroxide polymerization initiator having a peroxydicarbonate skeleton is represented by general formula [1]:

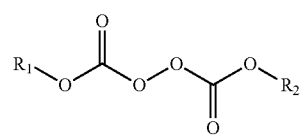

In general formula [1], $R_1$ and $R_2$ are each independently selected from alkyl groups, alkenyl groups, alkynyl groups, and aryl groups. The alkyl groups may have a substituent. Preferably, $R_1$ and $R_2$ are each independently selected from alkyl groups having 1 to 4 carbon atoms.

[Oily Olefin Monomer]

The oily olefin monomer used in the present invention is a monomer that is substantially immiscible with water and that forms an interface when mixed with water. The solubility of the oily olefin monomer in water is preferably 3% (3 g of the oily olefin monomer relative to 100 g of water) or less at room temperature (20° C.). When this condition is satisfied, a suspension can be satisfactorily formed in the suspension step. In addition, the oily olefin monomer is a radical polymerizable monomer that can be polymerized by cleavage of a radical polymerization initiator.

As the oily olefin monomer, polymerizable unsaturated aromatic monomers and polymerizable carboxylic acid esters are advantageous in terms of compatibility with organic solvents, stability of a suspension, controllability of a polymerization reaction, etc. Specific examples of the oily olefin monomer include, but are not limited to, styrene, chlorostyrene, α-methylstyrene, divinylbenzene, vinyltoluene, methyl (meth)acrylate, ethyl(meth)acrylate, and n-butyl(meth)acrylate. These oily olefin monomers may be used alone. Alternatively, a plurality of oily olefin monomers may be mixed to form a copolymer, as required. Alternatively, a plurality of oily olefin monomers may be sequentially added to form a gradient copolymer or a block copolymer. In particular, in order to obtain polymer particles containing a block copolymer, the polymerization step is preferably conducted in multiple stages. For example, polymer particles containing a block copolymer are obtained by conducting a polymerization step in a first stage using a single type of oily olefin monomer, and then charging another type of oily olefin monomer in the resulting suspension to conduct a polymerization step in a second stage.

[Oxidizing Agent]

The oxidizing agent used in the present invention is a water-soluble oxidizing agent and oxidizes iodide ions ($I^-$) to iodine molecules. The solubility of the oxidizing agent in water is preferably at least 3% (3 g of the oxidizing agent relative to 100 g of water) or more at room temperature (20° C.). The oxidizing agent that oxidizes iodide ions ($I^-$) to iodine molecules has a redox potential nobler than the redox potential (+0.536 V) of iodine. Specific examples of the oxidizing agent include, but are not limited to, hydrogen peroxide and salts containing a persulfate ion, a permanganate ion, a perchlorate ion, a chromate ion, or a dichromate ion. These oxidizing agents may be used alone or as a mixture of two or more oxidizing agents, as required.

[Polymer Particles]

The particle diameter of polymer particles according to the present invention can be appropriately adjusted by changing, for example, the suspension method in the suspension step or the type or the amount of dispersant used. The particle diameter of the polymer particles is not particularly limited. However, an average particle diameter of the polymer particles is preferably 300 μm or less, more preferably 20 nm or more and 100 μm or less, and still more preferably 50 nm or more and 50 μm or less.

The polymer particles of the present invention contain a polymer compound having an iodine atom at an end of a polymer chain. Such an iodine atom at an end can be identified by nuclear magnetic resonance (NMR) spectroscopy or the like. For example, an iodine atom bonded to an end of a polystyrene chain prepared on the basis of the present invention can be indirectly identified by detecting a signal (at 4 to 5 ppm in deuterochloroform) of a proton adjacent to the iodine atom by $^1$H NMR spectroscopy.

EXAMPLES

Examples of a method for producing polymer particles in the present invention will now be described. However, the present invention is not limited to these Examples.

(Method for Measuring Polymerization Conversion Rate)

A polymerization conversion rate was measured by gas chromatography (apparatus: manufactured by Agilent Technologies, column: HP-5 manufactured by Agilent Technologies) using a calibration curve method. Specifically, the amount (A) of oily olefin monomer in a suspension before a polymerization step and the amount (B) of oily olefin monomer in an aqueous dispersion of polymer particles after the polymerization step were respectively estimated by gas chromatography, and the polymerization conversion rate (%) was calculated from the difference between the amounts of oily olefin monomer. More specifically, the polymerization conversion rate was calculated by the following equation:

Polymerization conversion rate (%)=$(1-B/A)\times 100$ (Measurement of Molecular Weight)

Regarding molecular weights of polymer particles, the number-average molecular weight ($M_n$), the weight-average molecular weight ($M_w$), and the peak molecular weight ($M_p$) were measured by gel permeation chromatography (apparatus: HLC-8121GPC/HT, manufactured by Tosoh Corporation, column: TSKgel G2000H$_{XL}$/G3000H$_{XL}$/G4000H$_{XL}$, manufactured by Tosoh Corporation, mobile phase: tetrahydrofuran).

(Evaluation of Molecular-Weight Controllability)

Molecular-weight controllability was evaluated by comparing a peak molecular weight ($M_{p, suspension}$) in the case where suspension polymerization and reverse iodine transfer polymerization were combined in the present invention with a peak molecular weight ($M_{p, bulk}$) in the case where reverse iodine transfer polymerization was conducted by bulk polymerization with reference to Non-Patent Literature 1, the peak molecular weight ($M_{p, bulk}$) being described in a reference example below, at a polymerization conversion rate of 90% or more. Specifically, when a ratio $M_{p, suspension}/M_{p, bulk}$ was 0.9 or more and 1.1 or less, the molecular-weight controllability was evaluated as "good" and denoted by "A". When the ratio was out of the above range, the molecular-weight controllability was evaluated as "poor" and denoted by "B". When the evaluation could not be conducted, the evaluation result of the molecular-weight controllability was denoted by "-".

(Evaluation of Particle Diameter of Polymer Particles)

Regarding the particle diameter of polymer particles, the number-average particle diameter was measured with a precise particle size distribution analyzer using a pore electrical resistance method "Coulter Counter Multisizer 3" (registered trademark, manufactured by Beckman Coulter, Inc.). In the measurement, "ISOTON II" (manufactured by Beckman Coulter, Inc.) was used as an electrolyte aqueous solution. On the other hand, regarding polymer particles having a particle diameter of less than 1 μm, the number-average particle diameter was measured with a precise particle size distribution analyzer using a dynamic light scattering method "DLS8000" (manufactured by Otsuka Electronics Co., Ltd.).

(Evaluation of Iodine-Molecule Reaction Rate)

A reaction rate of iodine molecules was evaluated by observing an absorption band around 500 nm attributable to iodine molecules in respective oily liquids 1 and 2 using an ultraviolet-visible spectrophotometer. Specifically, an iodine-molecule reaction rate (%) was calculated by measuring the absorbance at 500 nm of each of the oily liquids 1 and 2, and quantitatively determining the amounts (mol) of iodine molecules in the oily liquids 1 and 2 by a calibration curve method.

(Measurement of Viscosity)

A viscosity (mPa·s) of an oily liquid was measured with a cone-plate rotational viscometer (device: RE-85L viscometer, manufactured by Toki Sangyo Co., Ltd.).

Example 1

Preparation Step

In a 100-mL glass container, 2.0 g of di-sec-butyl peroxydicarbonate (organic peroxide polymerization initiator, 10-hour half-life temperature: 51° C.), 0.7 g of iodine molecules, 2.8 g of a saturated polyester resin (polycondensate of propylene oxide-modified bisphenol A and isophthalic acid, Mw=10,000), and 56.2 g of styrene were uniformly mixed. A dark purple-red oily liquid 1 was obtained.

[Synthesis Step]

Subsequently, nitrogen gas was bubbled through the oily liquid 1 prepared as described above in an ice bath at a flow rate of 200 mL/min for 30 minutes to remove oxygen dissolved in the oily liquid 1, and the oily liquid 1 was then heated to 70° C. with a water bath in a nitrogen atmosphere. After 5 minutes from the start of the heating, heating was stopped, and the resulting product was cooled to room temperature. Thus, a purple-red oily liquid 2 (viscosity: 1 mPa·s) was obtained. The iodine-molecule reaction rate was 30%.

[Suspension Step]

To 220 g of ion-exchange water, 2.2 g of tricalcium phosphate (inorganic dispersant) was added, and the mixture was stirred at 15,000 rpm for 30 minutes. Subsequently, 1.0 mL of a 30% aqueous hydrogen peroxide was added to the resulting solution, and hydrochloric acid was added dropwise thereto to adjust the pH of the solution to 5. Thus, an aqueous solution was prepared. The oily liquid 2 was poured into the aqueous solution at one time. The mixture was stirred at 15,000 rpm for 10 minutes, and the stirring was then stopped. Thus, a suspension was obtained.

[Polymerization Step]

Next, the suspension was heated to 60° C. with a water bath in a nitrogen atmosphere. After seven hours from the start of the heating, heating was stopped to obtain an aqueous dispersion of polymer particles. A part of the aqueous dispersion was subjected to solid-liquid separation by centrifugal separation. The solid was then washed with dilute hydrochloric acid to remove the inorganic dispersant, and dried. Thus, polymer particles were obtained as a white powder.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as the white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 1. The results are summarized in Table 1.

Example 2

An aqueous dispersion of polymer particles and polymer particles were obtained as in Example 1 under the conditions of an iodine-molecule reaction rate of the oily liquid 2 of 30% and a viscosity of the oily liquid 2 of 1 mPa·s except that 56.2 g of styrene in Example 1 was changed to 56.2 g of methyl methacrylate.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 2. The results are summarized in Table 1.

Example 3

An aqueous dispersion of polymer particles and polymer particles were obtained as in Example 1 under the conditions of an iodine-molecule reaction rate of the oily liquid 2 of 30% and a viscosity of the oily liquid 2 of 1 mPa·s except that 56.2 g of styrene in Example 1 was changed to 44.7 g of styrene and 11.5 g of methyl methacrylate.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 3. The results are summarized in Table 1.

Example 4

An aqueous dispersion of polymer particles and polymer particles were obtained as in Example 1 under the conditions of an iodine-molecule reaction rate of the oily liquid 2 of 30% and a viscosity of the oily liquid 2 of 1 mPa·s except that, in Example 1, 2.0 g of di-sec-butyl peroxydicarbonate was changed to 2.1 g of 2,2'-azobis-(2,4-dimethylvaleronitrile) (azo polymerization initiator, 10-hour half-life temperature: 51° C.), the heating time in the synthesis step was changed from 5 minutes to 10 minutes, and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 4. The results are summarized in Table 1.

Example 5

An aqueous dispersion of polymer particles and polymer particles were obtained as in Example 2 under the conditions of an iodine-molecule reaction rate of the oily liquid 2 of 30% and a viscosity of the oily liquid 2 of 1 mPa·s except that, in Example 2, 2.0 g of di-sec-butyl peroxydicarbonate was changed to 2.1 g of 2,2'-azobis-(2,4-dimethylvaleronitrile), the heating time in the synthesis step was changed from 5 minutes to 10 minutes, and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 5. The results are summarized in Table 1.

Example 6

An aqueous dispersion of polymer particles and polymer particles were obtained as in Example 3 under the conditions of an iodine-molecule reaction rate of the oily liquid 2 of 30% and a viscosity of the oily liquid 2 of 1 mPa·s except that, in Example 3, 2.0 g of di-sec-butyl peroxydicarbonate was changed to 2.1 g of 2,2'-azobis-(2,4-dimethylvaleronitrile), the heating time in the synthesis step was changed from 5 minutes to 10 minutes, and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 6. The results are summarized in Table 1.

Example 7

An aqueous dispersion of polymer particles and polymer particles were obtained as in Example 1 under the conditions of an iodine-molecule reaction rate of the oily liquid 2 of 58% and a viscosity of the oily liquid 2 of 1 mPa·s except that the heating time in the synthesis step in Example 1 was changed from 5 minutes to 10 minutes. It was confirmed that the color of the oily liquid 2 of this Example was lighter than those of Examples 1 to 6.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 1. The results are summarized in Table 1.

Example 8

An aqueous dispersion of polymer particles and polymer particles were obtained as in Example 1 under the conditions of an iodine-molecule reaction rate of the oily liquid 2 of 82% and a viscosity of the oily liquid 2 of 1 mPa·s except that the heating time in the synthesis step in Example 1 was changed from 5 minutes to 15 minutes. It was confirmed that the color of the oily liquid 2 of this Example was lighter than that of Example 7.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 1. The results are summarized in Table 1.

Example 9

Preparation Step

In a 100-mL glass container, 2.0 g of di-sec-butyl peroxydicarbonate (organic peroxide polymerization initiator, 10-hour half-life temperature: 51° C.), 0.7 g of iodine molecules, 2.8 g of a saturated polyester resin (polycondensate of propylene oxide-modified bisphenol A and isophthalic acid, Mw=10,000), 25.6 g of butyl acrylate, and 20.0 g of toluene were uniformly mixed. A dark purple-red oily liquid 1 was obtained.

[Synthesis Step]

Subsequently, nitrogen gas was bubbled through the oily liquid 1 prepared as described above in an ice bath at a flow rate of 200 mL/min for 30 minutes to remove oxygen dissolved in the oily liquid 1, and the oily liquid 1 was then heated to 70° C. with a water bath in a nitrogen atmosphere. After 5 minutes from the start of the heating, heating was stopped, and the resulting product was cooled to room temperature. Thus, a purple-red oily liquid 2 (viscosity: 1 mPa·s) was obtained. The iodine-molecule reaction rate was 30%.

[Suspension Step]

To 220 g of ion-exchange water, 2.2 g of tricalcium phosphate (inorganic dispersant) was added, and the mixture was stirred at 15,000 rpm for 30 minutes. Subsequently, 1.0 mL of a 30% aqueous hydrogen peroxide was added to the resulting solution, and hydrochloric acid was added dropwise thereto to adjust the pH of the solution to 5. Thus, an aqueous solution was prepared. The oily liquid 2 was poured into the aqueous solution at one time. The mixture was stirred at 15,000 rpm for 10 minutes, and the stirring was then stopped. Thus, a suspension was obtained.

[Polymerization Step]

Next, a polymerization step in a first stage was conducted. The suspension was heated to 60° C. with a water bath in a nitrogen atmosphere. A suspension 1 after 4 hours from the start of the heating was sampled. Subsequently, a polymerization step in a second stage was conducted. A solution prepared by dissolving 0.5 g of di-sec-butyl peroxydicarbonate in 35.4 g of styrene was finely dispersed in 100 g of water using an ultrasonic homogenizer to prepare a dispersion. This dispersion was charged in the suspension, and the resulting mixture was further heated at 60° C. for 12 hours and then sampled as a suspension 2.

The polymerization conversion rate, the peak molecular weight ($M_{p,\ suspension}$) and the molecular-weight distribution ($M_w/M_n$) of the polymer particles in the suspension 1 were measured. According to the results, it was confirmed that the polymerization conversion rate was 96%, the peak molecular weight ($M_{p,\ suspension}$) was 4,300, and the molecular-weight distribution ($M_w/M_n$) was 1.7. The polymerization conversion rate, the peak molecular weight ($M_{p,\ suspension}$) and the molecular-weight distribution ($M_w/M_n$) of the polymer particles in the suspension 2 were measured. According to the results, it was confirmed that the polymerization conversion rate was 92%, the peak molecular weight ($M_{p, suspension}$) was 10,400, and the molecular-weight distribution ($M_w/M_n$) was 1.6.

From the above results, it was considered that polymer particles containing a block copolymer composed of butyl acrylate and styrene could be prepared.

Example 10

Preparation Step

In a 100-mL glass container, 2.0 g of di-sec-butyl peroxydicarbonate (organic peroxide polymerization initiator, 10-hour half-life temperature: 51° C.), 0.7 g of iodine molecules, 2.8 g of a saturated polyester resin (polycondensate of propylene oxide-modified bisphenol A and isophthalic acid, Mw=10,000), 56.2 g of styrene, and 7.7 g of hexadecane were uniformly mixed. A dark purple-red oily liquid 1 was obtained.

[Synthesis Step]

Subsequently, nitrogen gas was bubbled through the oily liquid 1 prepared as described above in an ice bath at a flow rate of 200 mL/min for 30 minutes to remove oxygen dissolved in the oily liquid 1, and the oily liquid 1 was then heated to 70° C. with a water bath in a nitrogen atmosphere. After 5 minutes from the start of the heating, heating was stopped, and the resulting product was cooled to room temperature. Thus, a purple-red oily liquid 2 (viscosity: 1 mPa·s) was obtained. The iodine-molecule reaction rate was 30%.

[Suspension Step]

To 90 g of ion-exchange water, 1.36 g of sodium dodecyl sulfate was added. Subsequently, 1.0 mL of a 30% aqueous hydrogen peroxide was added to the resulting solution, and hydrochloric acid was added dropwise thereto to adjust the pH of the solution to 5. Thus, an aqueous solution was prepared. The oily liquid 2 was poured into the aqueous solution at one time. The mixture was treated with an ultrasonic homogenizer of 300 W at 4° C. for ten minutes in a nitrogen atmosphere. Thus, a suspension was obtained.

[Polymerization Step]

Next, the suspension was heated to 60° C. with a water bath in a nitrogen atmosphere. The suspension after 6 hours from the start of the heating was sampled, and the particle diameter (number-average particle diameter), the polymerization conversion rate, the peak molecular weight ($M_{p, suspension}$) and the molecular-weight distribution ($M_w/M_n$) of the prepared polymer particles were measured. According to the results, the particle diameter was 189 nm, the polymerization conversion rate was 94%, the peak molecular weight ($M_{p, suspension}$) was 10,900, and the molecular-weight distribution ($M_w/M_n$) was 1.7. The peak molecular weight ($M_{p, suspension}$) of this Example was compared with the peak molecular weight ($M_{p, bulk}$) in Reference Example 1. The ratio $M_{p, suspension}/M_{p, bulk}$ was within the range of 0.9 to 1.1. Thus, it was considered that the molecular-weight controllability of this Example was good.

Example 11

An aqueous dispersion of polymer particles and polymer particles were obtained as in Example 4 except that, in Example 4, after the synthesis step, 0.3 g of an oil-soluble dye (copper tetra-tert-butyl phthalocyanine) was added as a functional substance to the oily liquid 2 and dissolved therein.

The polymerization conversion rate and the particle diameter were measured using the aqueous dispersion of polymer particles. The peak molecular weight ($M_{p, suspension}$) and the molecular-weight distribution ($M_w/M_n$) were measured using a solution prepared by dissolving the polymer particles obtained as a blue powder in tetrahydrofuran and removing insoluble matter in the tetrahydrofuran solution by filtration. According to the results, the particle diameter was 4.1 μm, the polymerization conversion rate was 92%, the peak molecular weight ($M_{p, suspension}$) was 10,800, and the molecular-weight distribution ($M_w/M_n$) was 1.7. The peak molecular weight ($M_{p, suspension}$) of this Example was compared with the peak molecular weight ($M_{p, bulk}$) in Reference Example 4. The ratio $M_{p, suspension}/M_{p, bulk}$ was within the range of 0.9 to 1.1. Thus, it was considered that the molecular-weight controllability of this Example was good.

Reference Example 1

Reference Examples described below are examples in which bulk polymerization was used in a polymerization reaction. In bulk polymerization, the reaction system is considered to be a single oil droplet, and a polymerization reaction occurs in the single oil droplet. In other words, bulk polymerization can be considered to be a reaction that occurs in a single oil droplet in suspension polymerization, the oil droplet being isolated from the outside.

Accordingly, in Reference Examples described below, whether data of Examples described above is ideal data or not is determined by comparing data of each Example with data of corresponding bulk polymerization.

In a 100-mL glass container, 2.0 g of di-sec-butyl peroxydicarbonate, 0.7 g of iodine molecules, and 56.2 g of styrene were charged, and uniformly mixed. A dark purple-red oily liquid was obtained. Subsequently, nitrogen gas was bubbled through this oily liquid in an ice bath at a flow rate of 200 mL/min for 30 minutes to remove oxygen dissolved in the oily liquid, and the oily liquid was then heated to 60° C. with a water bath in a nitrogen atmosphere. A polymer compound was obtained after seven hours from the start of the heating. The polymerization conversion rate, the peak molecular weight ($M_{p, bulk}$), and the molecular-weight distribution ($M_w/M_n$) of the polymer compound were measured. The results are summarized in Table 1.

Reference Example 2

A polymer compound was obtained as in Reference Example 1 except that 56.2 g of styrene in Reference Example 1 was changed to 56.2 g of methyl methacrylate. The polymerization conversion rate, the peak molecular weight ($M_{p, bulk}$), and the molecular-weight distribution ($M_w/M_n$) of the polymer compound obtained after seven hours from the start of heating were measured. The results are summarized in Table 1.

Reference Example 3

A polymer compound was obtained as in Reference Example 1 except that 56.2 g of styrene in Reference Example 1 was changed to 44.7 g of styrene and 11.5 g of methyl methacrylate. The polymerization conversion rate, the peak molecular weight ($M_{p, bulk}$), and the molecular-weight distribution ($M_w/M_n$) of the polymer compound obtained after seven hours from the start of heating were measured. The results are summarized in Table 1.

Reference Example 4

A polymer compound was obtained as in Reference Example 1 except that, in Reference Example 1, 2.0 g of di-sec-butyl peroxydicarbonate was changed to 2.1 g of 2,2'-azobis-(2,4-dimethylvaleronitrile), and the polymerization temperature was changed from 60° C. to 70° C. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Reference Example 5

A polymer compound was obtained as in Reference Example 2 except that, in Reference Example 2, 2.0 g of di-sec-butyl peroxydicarbonate was changed to 2.1 g of 2,2'-azobis-(2,4-dimethylvaleronitrile), and the polymerization temperature was changed from 60° C. to 70° C. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Reference Example 6

A polymer compound was obtained as in Reference Example 3 except that, in Reference Example 3, 2.0 g of di-sec-butyl peroxydicarbonate was changed to 2.1 g of 2,2'-azobis-(2,4-dimethylvaleronitrile), and the polymerization temperature was changed from 60° C. to 70° C. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Comparative Example 1

Preparation Step

In a 100-mL glass container, 2.0 g of di-sec-butyl peroxydicarbonate, 0.7 g of iodine molecules, 2.8 g of a saturated polyester resin (polycondensate of propylene oxide-modified bisphenol A and isophthalic acid, Mw=10,000), and 56.2 g of styrene were charged, and uniformly mixed. A dark purple-red oily liquid 1 was obtained.
[Suspension Step]
To 220 g of ion-exchange water, 2.2 g of tricalcium phosphate particles (inorganic dispersant) was added, and the mixture was stirred at 15,000 rpm for 30 minutes. Subsequently, 1.0 mL of a 30% aqueous hydrogen peroxide was added to the resulting solution, and hydrochloric acid was added dropwise thereto to adjust the pH of the solution to 5. Thus, an aqueous solution was prepared. The oily liquid 1 was poured into the aqueous solution at one time. The mixture was stirred at 15,000 rpm for 10 minutes, and the stirring was then stopped. Thus, a suspension was obtained.
[Polymerization Step]
Next, the suspension was heated to 60° C. with a water bath in a nitrogen atmosphere. After seven hours from the start of the heating, heating was stopped to obtain an aqueous dispersion of polymer particles. A part of the aqueous dispersion was subjected to solid-liquid separation by centrifugal separation. The solid was then washed with dilute hydrochloric acid to remove the inorganic dispersant, and dried. Thus, polymer particles were obtained as a white powder.
The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as the white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 1. The results are summarized in Table 1.

Comparative Example 2

An aqueous dispersion of polymer particles and polymer particles were obtained as in Comparative Example 1 except that 56.2 g of styrene in Comparative Example 1 was changed to 56.2 g of methyl methacrylate.
The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 2. The results are summarized in Table 1.

Comparative Example 3

An aqueous dispersion of polymer particles and polymer particles were obtained as in Comparative Example 1 except that 56.2 g of styrene in Comparative Example 1 was changed to 44.7 g of styrene and 11.5 g of methyl methacrylate.
The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 3. The results are summarized in Table 1.

Comparative Example 4

An aqueous dispersion of polymer particles and polymer particles were obtained as in Comparative Example 1 except that, in Comparative Example 1, 2.0 g of di-sec-butyl peroxydicarbonate was changed to 2.1 g of 2,2'-azobis-(2,4-dimethylvaleronitrile), and the polymerization temperature was changed from 60° C. to 70° C.
The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 4. The results are summarized in Table 1.

Comparative Example 5

An aqueous dispersion of polymer particles and polymer particles were obtained as in Comparative Example 2 except that, in Comparative Example 2, 2.0 g of di-sec-butyl peroxydicarbonate was changed to 2.1 g of 2,2'-azobis-(2,4-dimethylvaleronitrile), and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 5. The results are summarized in Table 1.

Comparative Example 6

An aqueous dispersion of polymer particles and polymer particles were obtained as in Comparative Example 3 except that, in Comparative Example 3, 2.0 g of di-sec-butyl peroxydicarbonate was changed to 2.1 g of 2,2'-azobis-(2,4-dimethylvaleronitrile), and the polymerization temperature was changed from 60° C. to 70° C.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 6. The results are summarized in Table 1.

Comparative Example 7

The suspension step was tried as in Comparative Example 1 except that the pH of the aqueous solution was adjusted to 2 in the suspension step of Comparative Example 1. However, tricalcium phosphate functioning as a dispersant was dissolved, and a stable suspension could not be prepared. Consequently, aggregation occurred, and polymer particles in a dispersed state could not be obtained.

Comparative Example 8

An aqueous dispersion of polymer particles and polymer particles were obtained as in Comparative Example 1 except that the pH of the aqueous solution was not adjusted without adding hydrochloric acid to the aqueous solution in the suspension step of Comparative Example 1.

The polymerization conversion rate and the particle diameter were measured using the aqueous dispersion of polymer particles. The peak molecular weight ($M_{p,\ suspension}$) and the molecular-weight distribution ($M_w/M_n$) were measured using a solution prepared by dissolving the polymer particles obtained as a white powder in tetrahydrofuran and removing insoluble matter in the tetrahydrofuran solution by filtration. Furthermore, the molecular-weight controllability was evaluated by comparing the peak molecular weight ($M_{p,\ suspension}$) with the peak molecular weight ($M_{p,\ bulk}$) in Reference Example 1. The results are summarized in Table 1.

TABLE 1

| | Monomer | Polymerization initiator | Polymerization method | Synthesis step | Reaction rate/% | Amount of $H_2O_2$ added | pH of aqueous solution |
|---|---|---|---|---|---|---|---|
| Example 1 | St | Di-sec-butyl peroxydicarbonate | Suspension polymerization | Performed | 30 | 1 | 5 |
| Example 2 | MMA | | | | 30 | | |
| Example 3 | St/MMA | | | | 30 | | |
| Example 4 | St | 2,2'-Azobis-(2,4-dimethylvaleronitrile) | | | 30 | 1 | 5 |
| Example 5 | MMA | | | | 30 | | |
| Example 6 | St/MMA | | | | 30 | | |
| Example 7 | St | Di-sec-butyl peroxydicarbonate | | | 50 | | |
| Example 8 | St | | | | 80 | | |
| Ref. Ex. 1 | St | Di-sec-butyl peroxydicarbonate | Bulk polymerization | Not performed | — | — | — |
| Ref. Ex. 2 | MMA | | | | — | | |
| Ref. Ex. 3 | St/MMA | | | | — | | |
| Ref. Ex. 4 | St | 2,2'-Azobis-(2,4-dimethylvaleronitrile) | | | — | | |
| Ref. Ex. 5 | MMA | | | | — | | |
| Ref. Ex. 6 | St/MMA | | | | — | | |
| Com. Ex. 1 | St | Di-sec-butyl peroxydicarbonate | Suspension polymerization | Not performed | — | 1 | 5 |
| Com. Ex. 2 | MMA | | | | — | | |
| Com. Ex. 3 | St/MMA | | | | — | | |
| Com. Ex. 4 | St | 2,2'-Azobis-(2,4-dimethylvaleronitrile) | | | — | 1 | 5 |
| Com. Ex. 5 | MMA | | | | — | | |
| Com. Ex. 6 | St/MMA | | | | — | | |
| Com. Ex. 7 | St | Di-sec-butyl peroxydicarbonate | | | — | 1 | 2 |
| Com. Ex. 8 | St | | | | — | 1 | 8.6 |

| | Conversion rate/% | Molecular weight ($M_p$) | $M_w/M_n$ | Molecular-weight controllability | Average particle diameter/μm |
|---|---|---|---|---|---|
| Example 1 | 90 | 10,500 | 1.5 | A | 4.4 |
| Example 2 | 92 | 10,600 | 1.4 | A | 4.2 |
| Example 3 | 91 | 10,300 | 1.4 | A | 3.5 |
| Example 4 | 98 | 10,200 | 1.5 | A | 4.0 |
| Example 5 | 97 | 10,400 | 1.4 | A | 3.7 |
| Example 6 | 97 | 10,200 | 1.3 | A | 4.1 |
| Example 7 | 93 | 10,500 | 1.4 | A | 3.9 |
| Example 8 | 95 | 10,700 | 1.5 | A | 4.0 |

TABLE 1-continued

| | | | | | |
|---|---|---|---|---|---|
| Ref. Ex. 1 | 93 | 10,900 | 1.3 | — | — |
| Ref. Ex. 2 | 95 | 10,500 | 1.4 | — | — |
| Ref. Ex. 3 | 92 | 10,600 | 1.3 | — | — |
| Ref. Ex. 4 | 92 | 10,200 | 1.4 | — | — |
| Ref. Ex. 5 | 93 | 10,200 | 1.5 | — | — |
| Ref. Ex. 6 | 96 | 10,600 | 1.4 | — | — |
| Com. Ex. 1 | 91 | 13,100 | 1.5 | B | 4.1 |
| Com. Ex. 2 | 91 | 13,200 | 1.4 | B | 4.0 |
| Com. Ex. 3 | 90 | 13,000 | 1.5 | B | 3.9 |
| Com. Ex. 4 | 98 | 16,300 | 1.6 | B | 4.2 |
| Com. Ex. 5 | 96 | 16,900 | 1.5 | B | 4.0 |
| Com. Ex. 6 | 98 | 16,600 | 1.5 | B | 3.8 |
| Com. Ex. 7 | — | — | — | — | — |
| Com. Ex. 8 | 84 | 11,500 | 1.5 | — | 4.1 |

(Note)
Ref. Ex.: Reference Example,
Com. Ex.: Comparative Example
St: Styrene,
MMA: Methyl methacrylate The method for producing polymer particles according to the present invention can achieve both satisfactory molecular-weight controllability and a satisfactory polymerization conversion rate. Accordingly, the method can be used for producing, for example, a polymerized toner or a functional binder contained in an ink-jet ink or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-133496 filed Jun. 15, 2011 and No. 2011-250857 filed Nov. 16, 2011, which are hereby incorporated by reference herein in their entirety.

What is claimed is:

1. A method for producing polymer particles, comprising:
a preparation step for preparing a first oily liquid containing an oily olefin monomer, a radical polymerization initiator, and an iodine molecule;
a synthesis step for obtaining a second oily liquid containing at least an iodine compound produced by a reaction between a radical generated by cleavage of the radical polymerization initiator and the iodine molecule in the first oily liquid;
a suspension step for obtaining an oil droplet of the second oily liquid by suspending the second oily liquid in an aqueous solution containing an oxidizing agent, an acid, and a dispersant; and
a polymerization step for polymerizing the oily olefin monomer in the oil droplet.

2. The method according to claim 1, wherein the second oily liquid contains at least the oily olefin monomer, the radical polymerization initiator, and the iodine compound.

3. The method according to claim 1, wherein the radical polymerization initiator is an oil-soluble radical polymerization initiator.

4. The method according to claim 1, wherein the pH of the aqueous solution is 4.0 or more and 7.0 or less.

5. The method according to claim 1, wherein an iodine-molecule reaction rate (%) ((1−[the amount (mol) of iodine molecule contained in the second oily liquid]/[the amount (mol) of iodine molecule contained in the first oily liquid])× 100), which represents a ratio of iodine molecule that has reacted with the radical generated by cleavage of the radical polymerization initiator in the second oily liquid, is 30% or more.

* * * * *